US006775661B1

(12) United States Patent
Redner

(10) Patent No.: US 6,775,661 B1
(45) Date of Patent: Aug. 10, 2004

(54) QUERYING DATABASES USING DATABASE POOLS

(75) Inventor: Jordan Lev Redner, Los Gatos, CA (US)

(73) Assignee: Lycos, Inc., Waltham, MA (US)

( * ) Notice: Subject to any disclaimer, the term of this patent is extended or adjusted under 35 U.S.C. 154(b) by 338 days.

(21) Appl. No.: 09/814,139

(22) Filed: Mar. 21, 2001

(51) Int. Cl.$^7$ .............................................. G06F 17/30
(52) U.S. Cl. ............................................ 707/3; 707/10
(58) Field of Search ................ 707/1–3, 10, 104.1; 709/217

(56) References Cited

U.S. PATENT DOCUMENTS

| | | | | |
|---|---|---|---|---|
| 5,442,791 A | * | 8/1995 | Wrabetz et al. ............. | 709/202 |
| 5,659,746 A | * | 8/1997 | Bankert et al. ............. | 707/205 |
| 5,915,250 A | * | 6/1999 | Jain et al. .................... | 707/100 |
| 6,195,652 B1 | * | 2/2001 | Fish .............................. | 707/2 |
| 6,269,394 B1 | * | 7/2001 | Kenner et al. .............. | 709/217 |
| 6,282,538 B1 | * | 8/2001 | Woods ......................... | 707/5 |
| 6,334,123 B1 | * | 12/2001 | Ross et al. ..................... | 707/2 |
| 6,338,055 B1 | * | 1/2002 | Hagmann et al. ............. | 707/2 |
| 6,397,206 B1 | * | 5/2002 | Hill et al. ..................... | 707/2 |
| 6,408,291 B1 | * | 6/2002 | Skeen et al. ................... | 707/2 |
| 6,484,184 B1 | * | 11/2002 | Mizushina et al. ...... | 707/104.1 |
| 6,507,847 B1 | * | 1/2003 | Fleischman ................. | 707/101 |
| 6,516,312 B1 | * | 2/2003 | Kraft et al. .................... | 707/3 |
| 2002/0065925 A1 | * | 5/2002 | Kenyon et al. ............. | 709/231 |

OTHER PUBLICATIONS

Dennis Shasha "Lessons from Wall Street: case studies in configuration, tuning, and distribution", ACM SIGMOD Record, Proceedings of the 1997 ACM SIGMOD international conference on Management of data, vol. 26, Issue 2, 1997, pp. 498–501.*

Berchtold et al "Independent quantization: an index compression technique for high–dimensional data spaces", Proceedings of the 16th International conference on Data Engineering, Feb. 29–Mar. 3, 2000, pp. 577–588.*

* cited by examiner

*Primary Examiner*—Uyen Le
(74) *Attorney, Agent, or Firm*—Fish & Richardson, P.C.

(57) ABSTRACT

Querying databases includes receiving a query for information, the query including a common identifier for a plurality of collections of data and indicating whether a result of the query may include a null result, searching each of the collections of data for the information, and considering a speed of each of the collections of data in performing the searching.

4 Claims, 3 Drawing Sheets

QUERYING DATABASES USING DATABASE POOLS

BACKGROUND

This invention relates to querying databases.

A user at a client system may send a request for information to another system. The other system searches a collection of data for information satisfying the user's request and returns any found information to the client system. In a network environment, the client system may include a computer terminal, the other system may include a server, and the collection of data may include a database. In such a network environment, the server may store and maintain the collection of data or the collection of data may be a separate data repository, such as a data server.

SUMMARY

According to one aspect of the invention, querying databases includes receiving a query for information, the query including a common identifier for a plurality of collections of data and indicating whether a result of the query may include a null result, searching each of the collections of data for the information, and considering a speed of each of the collections of data in performing the searching.

According to another aspect of the invention, a system includes a file including information about collections of data included in a group of collections of data, each collection of data included in the group being associated with a common identifier. The system also includes a first mechanism configured to monitor if access to each of the collections of data is currently available and to determine a speed of each of the collections of data and a second mechanism configured to search the group in response to a query including the common identifier and to consider the availability and the speed of each of the collections of data in performing the search.

One or more of the following advantages may be provided by one or more aspects of the invention.

Grouping databases together in a common group or namespace can enable a user knowing only the common group or namespace to search multiple databases. Multiple databases in the common group or namespace can be searched transparently to the user and results can be returned to the user from any of the multiple databases. Results may be quickly located in the common group or namespace by searching the databases in the common group or namespace from fastest database to slowest database. Furthermore, if any of the databases included in the common group or namespace becomes unavailable for any reason, the other databases in the common group or namespace may still be searched and search results may still be provided to the user. In this way, a database pool can be provided with transparent reliability.

Other advantages and features will become apparent from the following description and from the claims.

DETAILED DESCRIPTION

Figure 1:
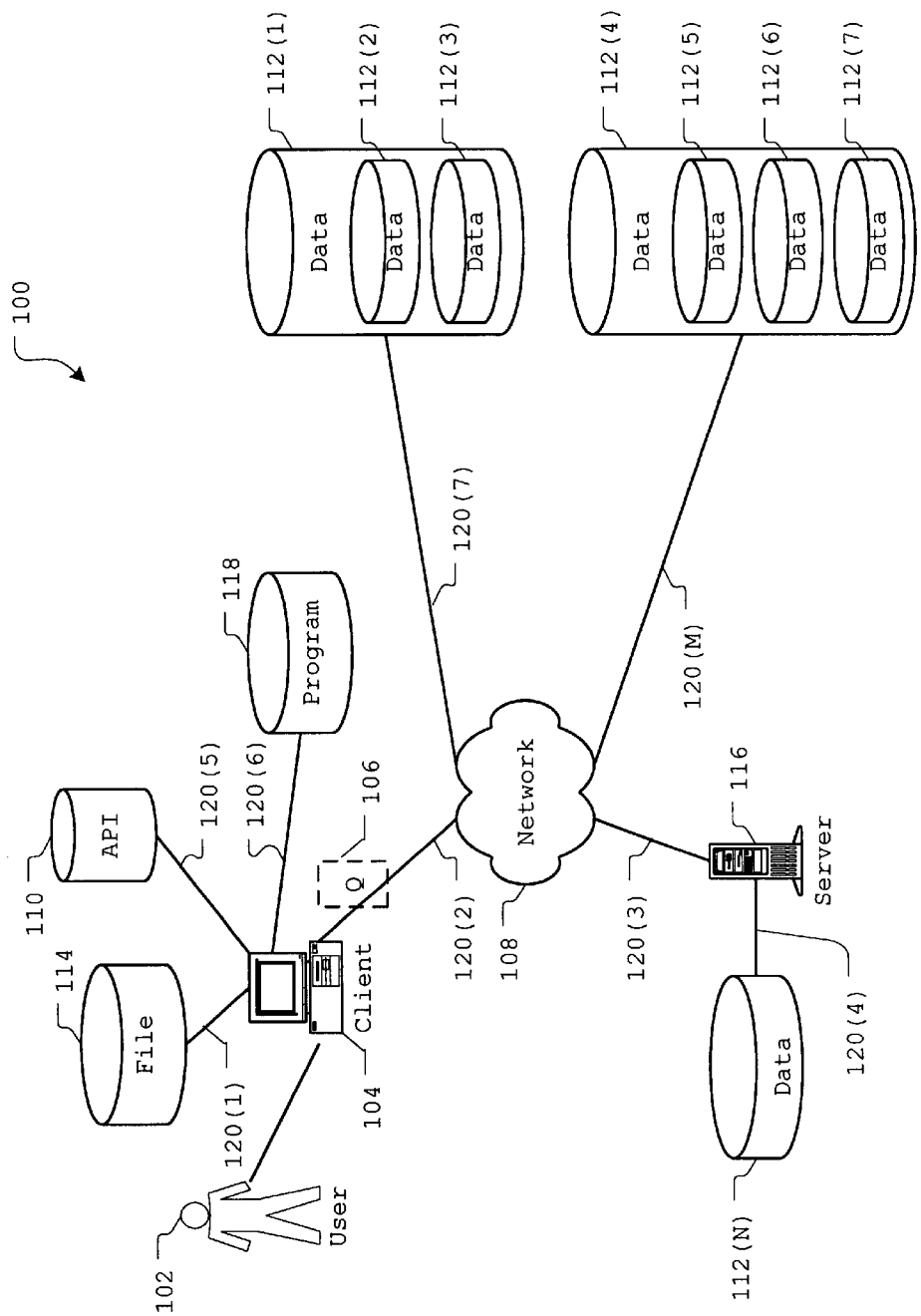
FIG. 1 is an exemplary network configuration.

Referring to FIG. 1, an exemplary network 100 includes a user 102 at a client 104 that can send a query 106 for information across a network 108 to one or more collections of data 112(1)–112(N). The query 106 includes a request for information, an indication of where to search for the information, and an indication of whether the client 104 will accept a null result. The client 104 uses an application program interface (API) 110 to search the one or more collections of data 112(1)–112(N).

The client 104 uses a file 114 in preparing the query 106. The file 114 includes lists of namespaces. Each namespace (database pool) describes one or more collections of data 112(1)–112(N). (N represents an integer.) The query 106 indicates which namespace the API 110 should consider in searching for information to satisfy the query 106. In this way, the API 110 can search one or more of the collections of data 112(1)–112(N) included in the indicated namespace for the information requested in the query 106.

If a collection of data included in the namespace is unavailable or down for any reason, the API 110 can still search other collections of data included in the namespace, thereby improving the chances of the API 110 finding information that satisfies the query 106. Further, if a collection of data included in the namespace is unavailable at the time the API 110 receives the query 106, becomes unavailable while the API 110 processes the query 106, or does not include information satisfying the query 106, the API 110 can search other collections of data included in the namespace transparently to the client 104.

The client 104 uses an application program interface (API) 110 and searches one or more of the collections of data 112(1)–112(N) indicated by the namespace included in the query 106 for the information requested in the query 106. Note that the API 110 may search local collections of data (e.g., a first collection 112(1) and a second collection 112(4)) and/or remotely located collections of data (e.g., distributed databases including the first collection 112(1) and a third collection 112(N) accessible through the network 108 and a remote server 116). The API 110 may search the collections of data included in the namespace in a particular order, e.g., fastest collection of data to slowest collection of data.

If the API 110 must return non-null information to the client 104, then the API 110 searches the one or more collections of data 112(1)–112(N) until the API 110 finds information to send to the client 104. Otherwise, the API 110 searches each one of the one or more collections of data 112(1)–112(N), returning either information to the client 104 or a null result indicating that information could not be located in the one or more collections of data 112(1)–112(N). In this way, the client 104 can receive a response to the query 106 even if information satisfying the query 106 is not located in the collections of data 112(1)–112(N).

Additionally, a program 118 (e.g., one or more threads or other similar program) can continually and/or periodically monitor the collections of data 112(1)–112(N). The program 118 may include any number of programs, may run at the client 104, may run at another location (e.g., at the remote server 116), and/or may include multiple programs running in multiple locations. The program 118 may monitor for conditions such as current availability of the collections of data 112(1)–112(N), speed of the collections of data 112(1)–112(N), and other similar information. The API 110 can use information collected or compiled by the program 118 in searching collections of data included in a namespace, such as in determining a particular order for searching the collection of databases included in a namespace or in determining which collections of data to exclude from a search due to unavailability.

Before further discussing the client's query 106 the response to the query 106, the elements in the exemplary network 100 are further described.

The elements in the exemplary network 100 can be implemented in a variety of ways. The network 108 can include any kind and any combination of networks such as an Internet, a local network, a private network, a public network, a local area network (LAN), or other similar network. Communications through the network 108 may be secured with a mechanism such as Transport Layer Security/Secure Socket Layer (TLS/SSL), wireless TLS (WTLS), or secure Hypertext Transfer Protocol (S-HTTP).

The client 104 can include any device capable of communicating with the network 108 and executing and loading the API 110 such as a device having a central processing unit (CPU) or similar processing mechanism. Examples of the client 104 include a server, a mobile computer, a stationary computer, a workstation, a telephone, a pager, a personal digital assistant, a television, and other similar devices.

The remote server 116 can include any device capable of communicating with a collection of data and the network 108 such as a server, a mobile computer, a stationary computer, or other similar device.

The collections of data 112(1)–112(N) can each include a storage mechanism such as a data queue, a buffer, a local or remote memory device, or other similar mechanism. The information may be organized in the collections of data 112(1)–112(N) as databases.

The file 114 may be organized in any way that associates the collections of data 112(1)–112(N) with namespaces, e.g., organized as a configuration file or other similar file. The file 114 can include information for any number of namespaces. The file 114 can be included in the client 104, be otherwise accessible to the client 104, and/or be located elsewhere in the exemplary network 100.

The API 110 may be any program capable of interpreting and executing the query 106 either on its own or using other routines, protocols, tools, and so forth, available to the API 110. For example, the API 110 may include a Java Database Connectivity (JDBC) API, an Open Database Connectivity (ODBC) API, or other similar program.

Communication links 120(1)–120(M) between various elements included in the exemplary network 100 can include any kind and any combination of communication links such as modem links, Ethernet links, cables, point-to-point links, infrared connections, fiber optic links, cellular links, wireless links such as Bluetooth, satellite links, and other similar links. (M represents an integer.) Any protocol may be used to communicate across the communication links 120(1)–120 (M).

The exemplary network 100 has been simplified for ease of explanation. The exemplary network 100 may include more or fewer elements such as other networks, communication links, proxy servers, firewalls or other security mechanisms, Internet Service Providers (ISPs), and other elements.

Figure 2:
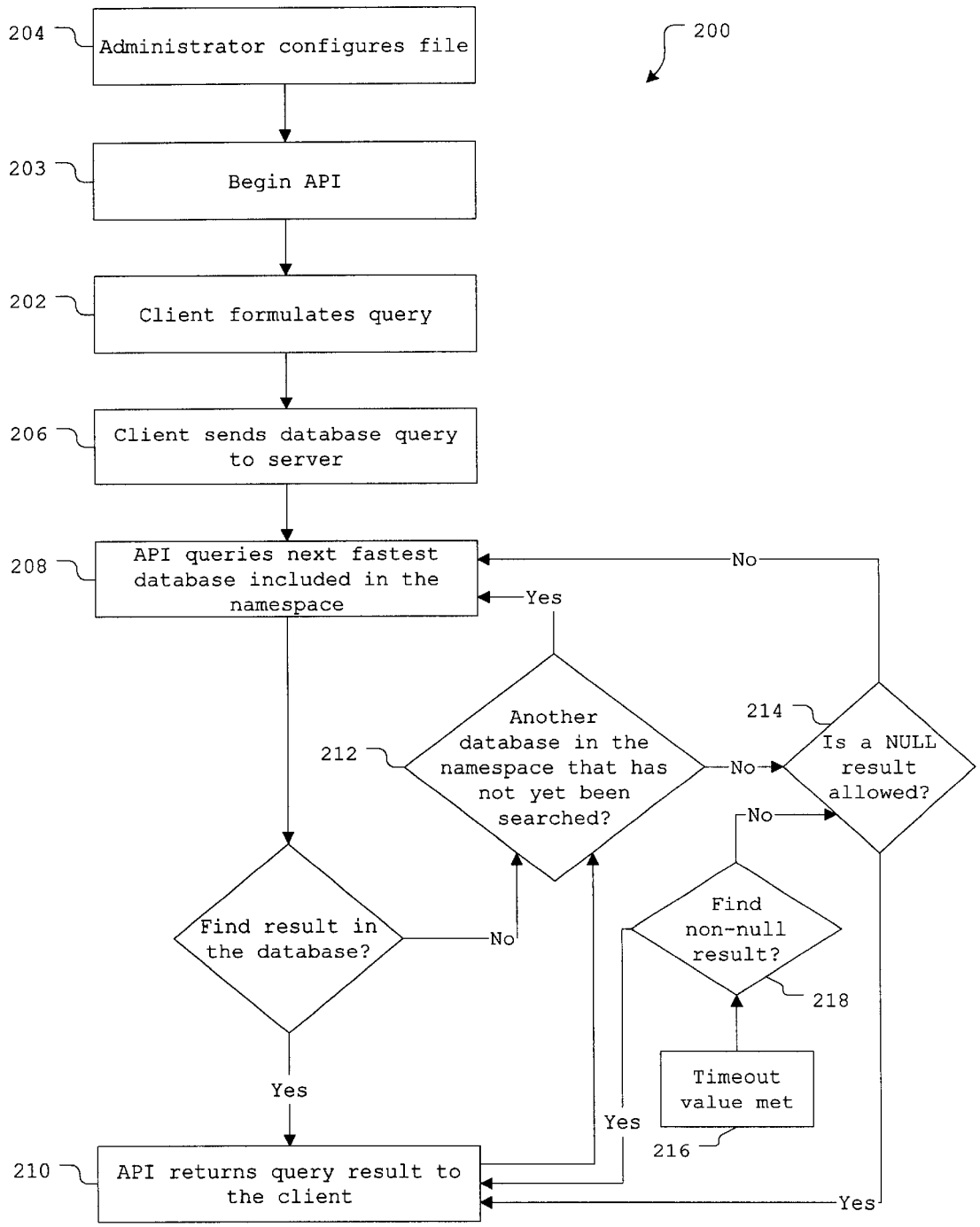
FIG. 2 is a flowchart showing a database querying process.

Referring to FIG. 2, a process 200 illustrates an example of a query interaction between the client 104 and the collections of data 112(1)–112(N) in the exemplary network 100 of FIG. 1.

The client 104 begins 203 using the API 110 and formulates 202 the query 106 to send to the collections of data 112(1)–112(N). The client 104 may package the query 106 for transmission to the network 108, but the user 102 typically provides information to the client 104 to include in the query 106. The query 106 as a method may include arguments such as a statement, a null flag, a timeout value, and a namespace, although the query 106 may include more or less arguments. Each of these four example arguments is described further below. The arguments included in the query 106 may form a class.

The statement indicates what information the user 102 wants the API 110 to try to find in one or more of the collections of data 112(1)–112(N). The user 102 may request any type of information in the query 106. Examples of information that the user 102 may request include a news headline on a particular day or from a particular publication, a stock quote for a stock on a particular day, a news story having a particular news identification code, a phone number for an employee, and other similar information. The statement may be structured in a query language such as structured query language (SQL). An example of an SQL statement requesting a news story on flooding in California written by Jones may be a string such as: SELECT * FROM titles WHERE title=' California flooding' AND author=' Jones'.

The null flag indicates whether the API 110 can return a null result to the client 102, e.g., whether the API 110 can stop searching the namespace before finding information satisfying the statement. The null flag may be a Boolean true/false flag where one true/false state indicates acceptability of a null result while the other true/false state indicates unacceptability of a null result. The user 102 may want to disallow a null result if, for example, the user 102 knows that at least one of the collections of data included in the namespace includes a non-null result to the query 106 and that the API 110 should search the namespace until it finds a result.

The timeout value indicates how long the API 110 should search the namespace before returning a null result to the client 104. The timeout value may be an integer or non-integer expressed in seconds, any fraction or multiple of seconds, clock cycles, or another similar timing unit. If the null flag indicates that the client 104 will not accept a null result, then the timeout value may not be included in the class of arguments sent to the API 110, may be empty, or may equal zero or other value indicating that no timeout value exists.

The namespace, as mentioned above, describes one or more of the collections of data 112(1)–112(N). The namespace argument may be a string identifying a namespace by name, by identification code, or by another similar identifier. In this way, the user 102 can specify collections of data for the API 110 to search by indicating a namespace string to the client 104 for the query 106, i.e., without knowing specific names of collections of data. Entering a namespace string rather than names of individual collections of data not only can save time and allow the user 102 to query multiple collections of data with a single query 106, but namespace strings are typically easier for the user 102 to remember and to enter because namespace strings are typically shorter than names of individual collections of data. Additionally, an administrator or an automatic routine may manually or automatically add collections of data to or remove collections of data from a namespace in the file 114 unbeknownst to the user 102.

A namespace string may be written in dot notation, e.g., company.news for a namespace including collections of data provided by company and regarding news. The company.news namespace may include four collections of data, each including the namespace string as part of its name, such as, company.news.local, company.news.national, company.news.world, and company.news.partnerl.

When the user 102 provides a namespace string to the client 104, the client 104 uses the file 114 to identify which of the collections of data 112(1)–112(N) are included in that namespace and possibly to gather additional information regarding the namespace to include in the query 106 to the API 110. The client 104 may include information in the file 114 in the query 106. An example of a list 300 included in the file 114 describing the company.news collection of data is shown in FIG. 3.

Figure 3:
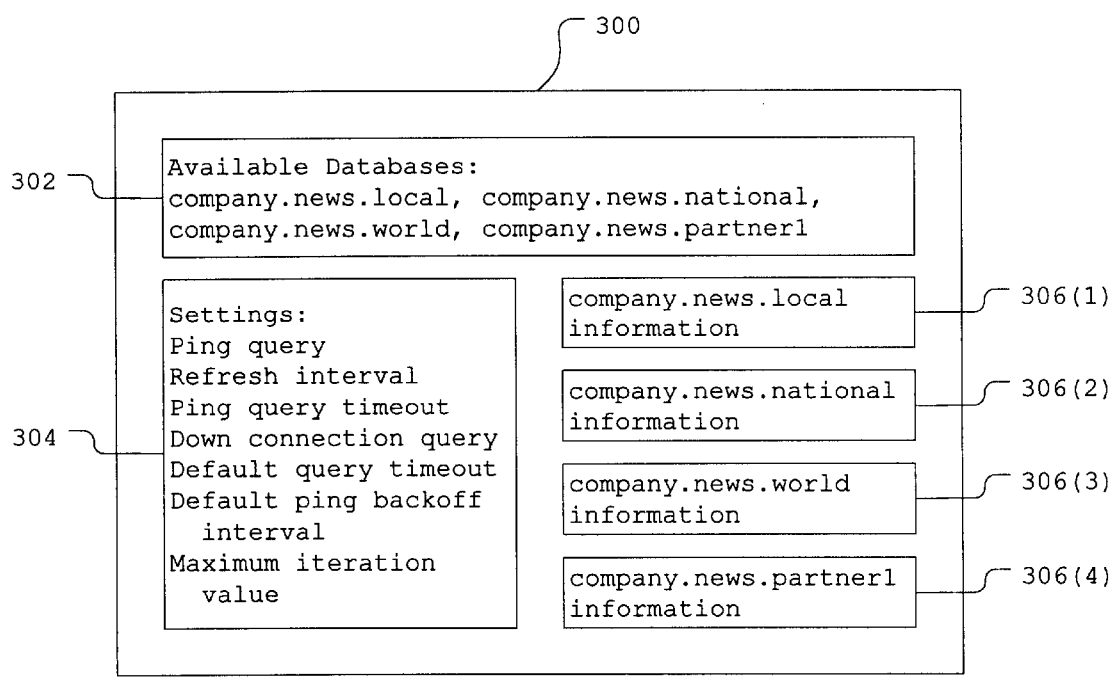
FIG. 3 is a block diagram of a configuration file.

Referring to FIG. 3, the list 300 (a configuration file in this example) includes name information 302 of collections of data included in the company.news namespace, settings information 304, and specific collection of data information 306(1)–306(4). The names information 302 includes the four company.news collection of data names mentioned above. The API 110 considers these collections of data in searching for an answer to the statement.

The settings information 304 includes parameters to include in the query 106 that the API 110 may use in performing its search. Examples of the parameters include:

a) a ping query for testing the amount of time a query takes to travel to and from a collection of data included in the names information 302 (e.g., an executable command line, an SQL query line, or other similar query), b) a refresh interval indicating how often the program 118 should check the health of the collections of data included in the names information 302 (e.g., a time interval in seconds, milliseconds, clock cycles, etc.), c) a ping query timeout value indicating how long to wait for a response to the ping query (e.g., a time interval in seconds, milliseconds, clock cycles, etc.), d) a down connection query indicating how long to wait before attempting to bring an unavailable collection of data back into the namespace (e.g., a time interval in seconds, milliseconds, clock cycles, etc.), e) a default query timeout value indicating a default timeout value if the timeout value discussed above is not submitted in the query 106, f) a ping backoff interval indicating a backoff interval for the program 118 (e.g., a time interval in seconds, milliseconds, clock cycles, etc.), g) a maximum iteration value indicating a maximum number of times to search each collection of data included in the namespace before returning a null result to the client 104, and h) other similar information.

The specific collection of data information 306(1)–306(4) includes information for each of the collections of data listed in the names information 302. Such information for a collection of data may include:

a) a location of the collection of data (e.g., a uniform resource locator (URL), a uniform naming convention (UNC) location, or other similar location), b) a driver associated with the collection of data, c) a validity query for testing the availability of the collection of data (e.g., an executable command line, an SQL query line, or other similar query), and d) other similar information.

Each specific collection of data information 306(1)–306(4) may also include information regarding generation of the list 300 (although such information may instead by included in the settings information 304):

a) a refresh check interval, b) a maximum number of collections of data that may be included in the namespace, c) a remainder number indicating the number of collections of data that may be added to the namespace before exceeding the maximum number, d) a wait time indicating how long to wait between adding collections of data to the namespace (e.g., a time interval in seconds, milliseconds, clock cycles, etc.), and e) other similar information.

Each specific collection of data information 306(1)–306(4) may also include variables for user information regarding the user 102 such as a user identification code, a password, and other similar information.

The information included in each specific collection of data information 306(1)–306(4) may be formatted using the same query language used for the statement included in the query 106.

Referring again to FIG. 2, a human operator (administrator) can configure 204 the lists included in the file 114 before the client 104 transmits any queries to the network 108. Each list can include any number of collections of data and collections of data in various locations through the network 108. The administrator may also have the ability to reconfigure the lists included in the file 114.

Once the client 104 formulates the query 104, the client 104 transmits 206 the query 106 to the network 108. The API 110 uses information included in the query 106 to search one or more of the collections of data included in the namespace indicated in the query 106.

The API 110 queries 208 the one or more collections of data included in the namespace using the API 110. The first collection of data that the API 110 queries is the fastest collection of data as determined by the program 118. The program 118 may evaluate the speed of the collections of data included in the namespace by determining a response time between each collection of data included in the namespace and the program 118. The program 118 can formulate an ordered list of the collections of data included in the namespace from lowest response time (fastest collection of data) to highest response time (slowest collection of data). The program 118 may calculate such a response time by executing the ping queries included in the file 114 and associated with each of the collections of data. (The API 110 may, however, query the collections of data in another particular or random order as mentioned above.)

If the API 110 finds a result satisfying the query 106 in this first-searched collection of data, then the API 110 returns 210 the result to the client 104. The process 200 may end once the API 110 finds the result or the API 110 may determine 212 if the namespace includes a collection of data that the API 110 has not yet searched. (If a null result is not allowed, then the API 110 may instead determine if the namespace includes a collection of data that the API 110 has not searched in this search iteration through the namespace.) The API 110 may be instructed or configured to continue searching the namespace if, for example, the user 102 indicates a desire to receive as many "hits" as possible from the namespace.

The API 110 may determine if an unsearched collection of data exists in the namespace by examining the ordered list of the collections of data. If any collections of data remain in the ordered list below the previously searched collection of data (i.e., there is a slower collection of data), then an unsearched collection of data exists.

If an unsearched collection of data exists in the namespace, then the API 110 continues searching the namespace by searching 208 the next fastest collection of data included in the namespace. However, if an unsearched collection of data exists because the unsearched collection of data is unavailable, then the API 110 may consider the namespace completely searched.

If the API 110 has searched all collections of data included in the namespace, the API 110 determines 214 if the query 106 allows a null result. The API 110 may determine the permissibility of a null result by examining the null flag included in the query 106. If a null result is allowed, then the API 110 sends 210 a null result to the client 104. If a null result is not allowed, then the API 110 continues searching the namespace by querying 208 the next fastest collection of data included in the namespace. The next fastest collection of data would be the fastest collection of data included in the namespace as the API 110 is beginning a new search iteration of the namespace.

The API 110 may be configured to search the namespace a particular number ("X") of times, e.g., run a certain number of search iterations. After X iterations without finding information to satisfy the query, the API 110 may return a null result to the client 104 whether a null result is allowed or not. In this way, the API 110 can avoid running in an infinite loop if a null result is not allowed and the API 110 cannot locate information satisfying the query 106 after X iterations. X can be a configurable parameter included in the file 114 (e.g., the maximum iteration value). X may vary from namespace to namespace.

If the API 110 does not find a result satisfying the query 106 in the first-searched collection of data, then the API 110 determines 212 if the namespace includes a collection of data that the API 110 has not yet searched and continues the process 200 as described above.

The API 110 may return query results to the client 104 as the API 110 finds a result in a collection of data, after the API 110 has searched the entire namespace, or after the timeout value is met 216. The API 110 sends a null result to the client 104 once the API 110 searches the entire namespace (or if the timeout value is met) and determines that a null result is an acceptable query result.

At some point after the API 110 begins searching the namespace, the timeout value may be met 216. Once met, the API 110 determines 218 if the API 110 has found a non-null result in the namespace. If so, then the API 110 sends 210 the non-null result to the client 104 (if the API 110 has not yet sent the non-null result to the client 104). The process 200 then ends, the API 110 having found and returned a query result to the client 104. If a non-null result has not been found, then the API determines 214 if a null result is allowed and the process 200 continues as described above.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A system comprising:

a network;

a file including information about two or more groups of databases, a namespace being associated with each group;

a client configured to read the file and to receive a request from a user for a search query, the request including a namespace that can match namespaces of databases in a particular group from the two or more groups of databases, the query also indicating whether a result of the search query may include a null result; and one or more servers configured to only search the particular group of databases in response to the search query, the search query considering the availability and the speed of each of the databases; and a process configured to monitor if access to each of the databases is currently available and to determine a speed of each of the databases, the process producing information describing the availability and speed of each of the databases.

2. The system of claim 1, wherein the one or more servers consider the availability and the speed of each of the databases based on the information from the process.

3. The system of claim 1 in which the file also includes a time indicating a frequency with which the process monitors access to each of the databases.

4. The system of claim 1, wherein the file also includes a time indicating a frequency with which the first mechanism monitors the speed of each of the databases.

* * * * *